United States Patent Office 3,542,664
Patented Nov. 24, 1970

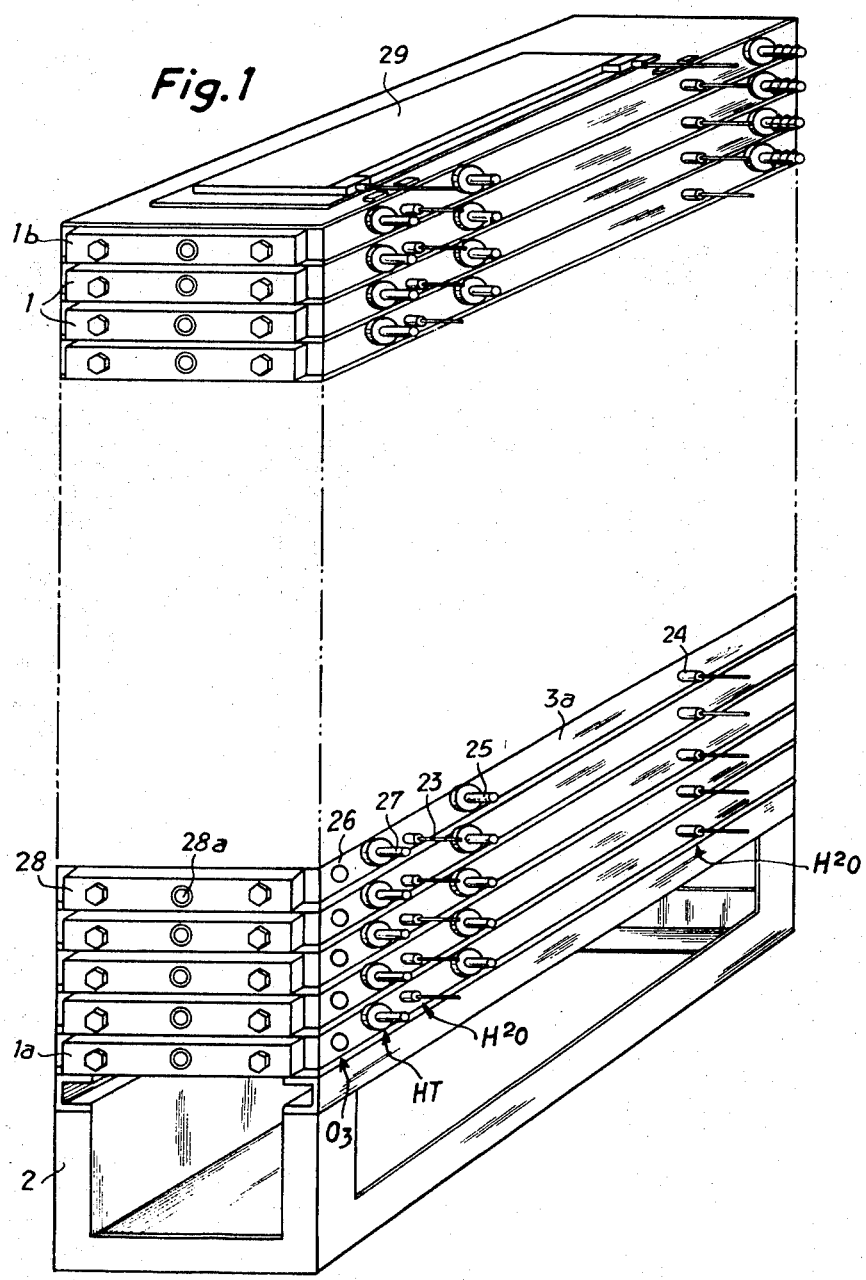

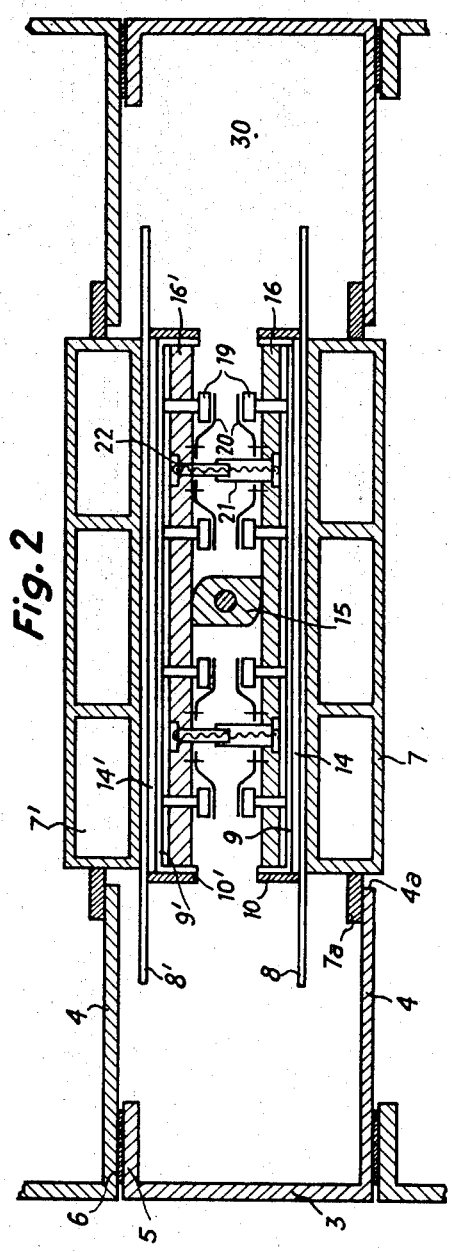
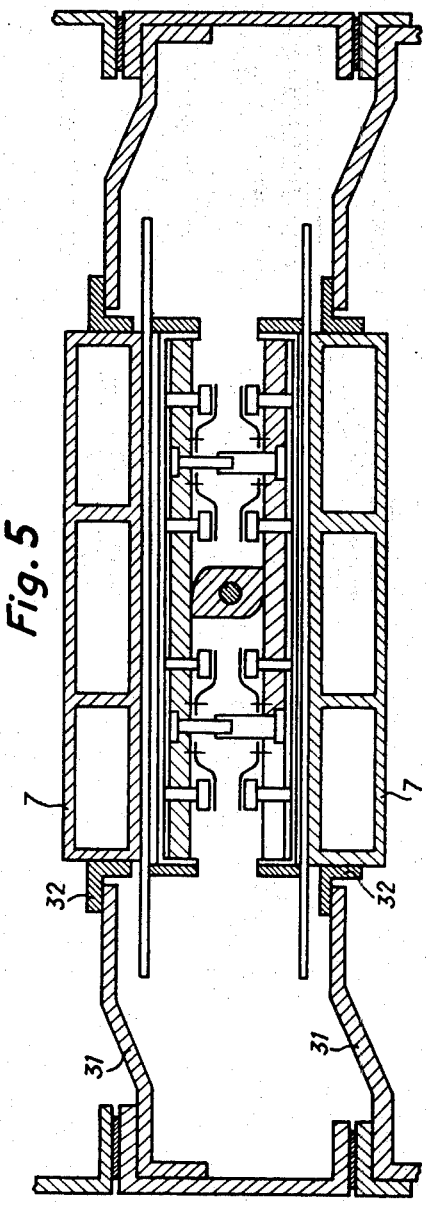

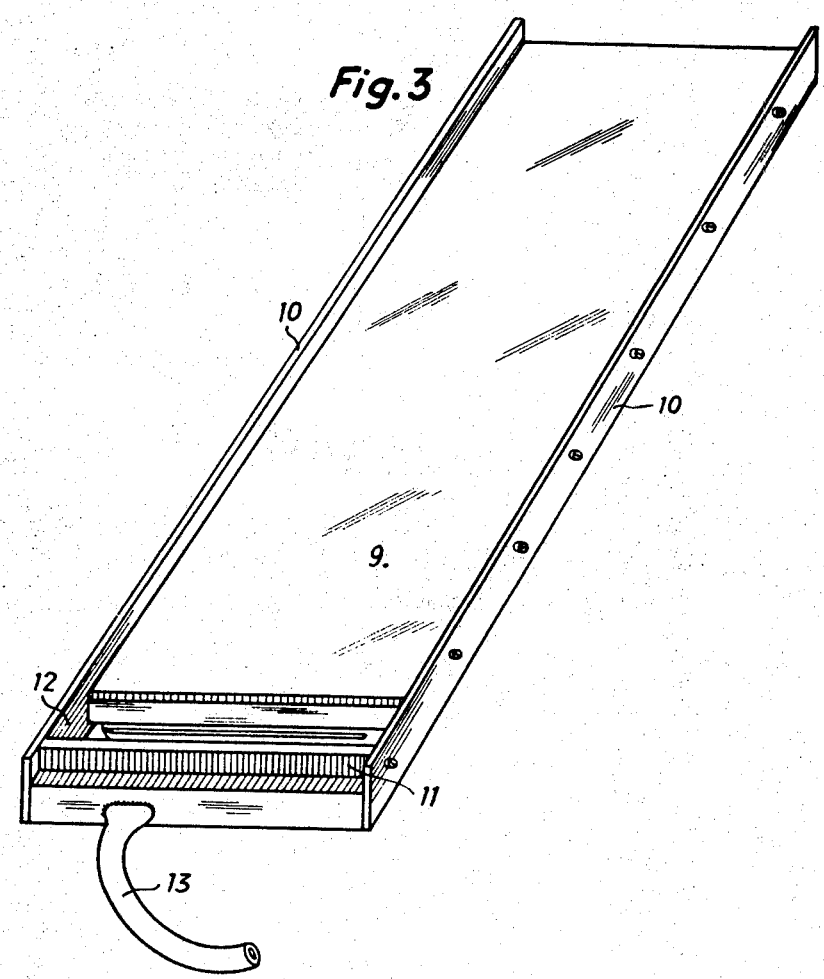
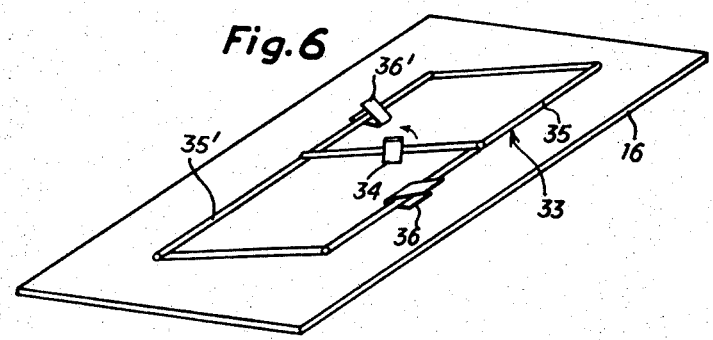

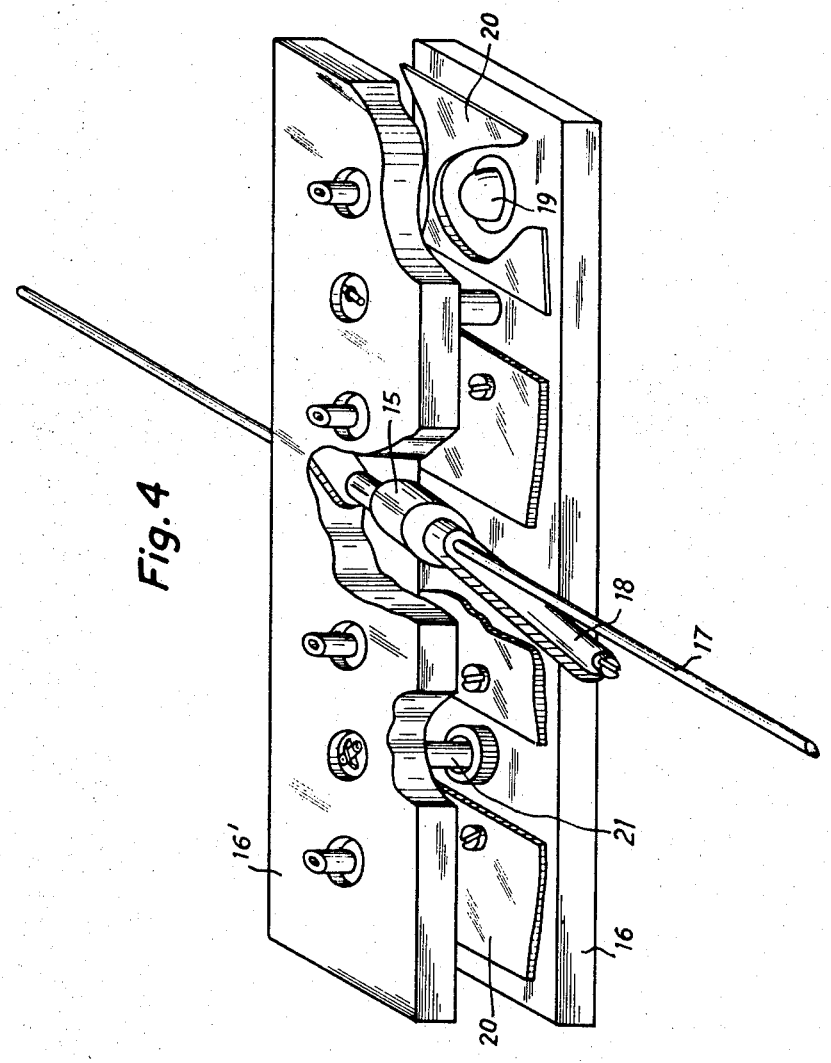

3,542,664
OZONE-PRODUCING APPARATUS
Jean Guillerd, Paris, Jacques Reinmann, Courbevoie, and Roger Camberlyn, Sarcelles, France, assignors to Societe Anonyme dite: Compagnie des Eaux et de l'Ozone, Paris, France
Filed Apr. 2, 1968, Ser. No. 718,174
Claims priority, application France, Apr. 6, 1967, 101,724
Int. Cl. C01b 13/12
U.S. Cl. 204—322  3 Claims

ABSTRACT OF THE DISCLOSURE

This invention relates to ozone-producing apparatus that can comprise a number of individual elements stackable together so that any desired output from the apparatus may be obtained, depending upon the number of elements used. Each element comprises a parallelopipedic casing whose major opposed faces are open and a water-cooled, hollow ground electrode is supported by fins on the internal edges of these opposed faces, a high voltage electrode constituted by a pair of thin metal plates, a thin dielectric member being applied against said high voltage electrode. Means may be actuated from outside the casing to apply the dielectric member against the ground electrode and the casing is apertured at its opposite ends for input or output of ozonised air or ozone.

---

The present invention relates to improvements in ozone-producing apparatus and has for an object apparatus that is composed of individual ozone-producing elements, any number of which may be grouped together and the assembly of which enables a high, constant production of ozone to be obtained with a very high yield.

It is known that at present ozone-producing apparatus exist which comprise a certain number of discharger elements identical to flat electrodes. These elements are grouped side by side in closed enclosures, and are each composed of a ground electrode against which is applied a solid dielectric, and of a high voltage electrode, situated at a certain distance from this dielectric, the air or the dry oxygen to be ozonised circulating in the space thus defined so as to be subjected therein to an electric discharge, in order to be evacuated, once ozonised, by a central collector.

This construction presents a certain number of disadvantages:

As the enclosure containing the elements is of fixed dimensions, the number of discharger elements is limited so that it is not possible, from a given assembly, to increase even slightly the number of elements, unless by adding a second enclosure protecting the necessary additional elements which, if they are small in number, lead to a poor use of said enclosure.

Moreover, such an enclosure cannot operate under pressure despite the technical advantage that there would be if it could do so.

The repair or replacement of a damaged element necessitates interrupting the operation of the ozonizer for the fairly long duration of the dismantling and re-assembly operations.

Despite a pipe device intended for forcing air to explore the whole discharge surface, this exploration is not absolutely systematic.

Finally, by its very nature, such an apparatus can be constructed only on a small scale, which does not enable the cost to be reduced.

It is a further object of the invention to eliminate or substantially minimise all these disadvantages whilst contributing in addition a certain number of supplementary advantages.

According to the invention, an apparatus for producing ozone is composed of an assembly of independent and interchangeable ozone-producing elements which are stacked one on top of the other so as to cooperate in pairs, and each element comprising:

(a) A parallelopipedic casing whose major opposed faces are open.

(b) A water-cooled, hollow ground electrode supported by fins resting on the internal edges of said open faces.

(c) A high voltage electrode constituted by a pair of thin metal plates.

(d) A thin dielectric member applied against the ground electrode.

(e) A discharge chamber in said casing defined by peripheral strips on said dielectric member.

(f) Means actuable from the outside, to apply said dielectric member and said high voltage electrode, under pressure, against said ground electrode, for closing said discharge chamber in a sealed manner.

(g) Apertures for the inlet of dry air and the evacuation of ozonised air, arranged respectively at the opposite ends of said casing, the air passing through the discharge space longitudinally between the dielectric and the high voltage electrode.

(h) Connections necessary for feeding high voltage electric current and cooling water.

Such an element may perfectly well be used individually, if the need for ozone is small. Conversely, any member of such elements may be grouped together, producing the various connections thereof in parallel, so as to multiply the production of ozone accordingly. Any element need be placed out of action for the purpose of repair or replacement for only a very short time, on account of the simplicity of the dismantling and reassembly operations.

An ozone-producing apparatus according to the invention is therefore composed of identical elements, grouped in the number necessary to ensure that the actual needs are met with, this number being modifiable so as to correspond to the modifications of these needs. The overall size of the apparatus will always be exactly that of the number of elements in use and this apparatus can operate under pressure, the elements grouped together constituting a sealed enclosure.

In order that the invention may be more clearly understood, reference will now be made to the accompanying drawings which illustrate certain embodiments thereof by way of example, and in which:

FIG. 1 illustrates an apparatus comprising a stack of individual elements according to the invention, FIG. 2 shows a cross-sectional view of a single ozoniser element according to the invention, FIG. 3 shows a perspective view of the high voltage electrode, FIG. 4 is a perspective view partly exploded, of a spacer system, FIG. 5 shows a modification of the element of FIG. 2, and FIG. 6 shows a modification of the spacer system of FIG. 4.

Referring now to the drawings, with particular reference to the embodiments shown in FIGS. 1 and 2 of the drawings, an ozoniser according to the invention comprises a certain number of unitary drawer-like elements 1 stacked one on top of the other, the lowest drawer 1a of the pile being mounted on a support frame 2.

Each drawer is constituted by a parallelopipedic casing 3, the base 4 of which is provided with a central opening 4a to receive a ground electrode, and the top 5 of which is largely open and may be securely fixed to the base plate of the casing of the drawer located immediately above, with the interposition of a sealing joint 6.

The central opening 4a is closed by a hollow ground electrode 7 of the type cooled by water, made for example of aluminium alloy; this electrode is held in place in the central opening by a side fin 7a, fixed to the part of the base plate 4 which borders this central opening 4a. In this way, the same ground electrode may serve for two consecutive drawers.

Each drawer therefore comprises two ground electrodes 7 and 7' against which are respectively applied dielectric plate members 8, 8', thus cooled by close contact with the ground electrode; these dielectric members may be simple thin glass plates.

Between these dielectric members are mounted high voltage electrodes 9, 9', constituted for example by two rectangular plates made of light metal or polished stainless steel; each of these plates is bordered on the one hand on its longitudinal sides by strips 10, 10', made of an insulating material resistant to high voltage and ozone, and, on the other hand, on one of its ends by an insulating strip 11 (FIG. 3), a recess being provided between said plate and the strip 11 in order to form a sealed, ozone-collecting chamber 12, to which is connected a conduit 13 for evacuating the ozone. In this way, this system of insulating strips, with the high voltage electrode and the corresponding dielectric member, defines a sealed discharge chamber 14, 14', the height of which is thus strictly controlled, and through which the air to be ozonised, entering through the open end of said chamber, circulates longitudinally, and the ozone formed is collected in a collector chamber 12.

In order to ensure the positioning of the dielectric members 8, 8', on the ground electrodes 7, 7', the two plates constituting the high voltage electrodes 9, 9', are located by a spacing system which, in one embodiment, comprises a cam 15 (FIG. 4) which may be operated from the outside of the drawer and acting on support plates 16, 16', secured to the high voltage electrodes and insulating strips, a shaft 17 of the cam being in addition articulated to the support plate 16 by means of a small rod 18. Moreover, a system of buttons 19, with compensating springs 20 and guides 21 with return spring 22 is provided for regulating the action of the tightening cam and for compensating the differences in dimensions due to machining tolerances.

As may be seen in FIG. 1 of the drawings, there are arranged on one of the longitudinal side walls 3a of the casing all the apertures serving for each drawer, namely:

An inlet 23 and an outlet 24 for the water cooling the ground electrodes;

An inlet 25 for the air to be ozonised and an outlet 26 for the ozone;

An input terminal 27 for high voltage current.

Similarly, each drawer may be closed at the level of the side end walls by an individual door 28 provided with a porthole 28a for observing the discharge, during the operation of the ozoniser.

In addition, the upper drawer 1b may be closed by a cover 29.

During operation, the dry air to be ozonised is admitted, into each drawer, through the inlet apertures 25, circulates in the internal space 30 comprised between the walls of the casing and the discharger, penetrates into the discharge chamber 14, 14', which it crosses longitudinally during ozonisation; the ozone formed is collected in the ozone chambers and is evacuated through the conduits 13.

If a drawer fails to operate, it is sufficient to open the door 28 of this drawer, and to operate the spacing system so that the dielectric members and the high voltage electrodes can be removed and the faulty element replaced, this operation being very simple and requiring only a few moments at the most.

According to the modification shown in FIG. 5 of the drawings, the base plates 4 of the casings which insulate the drawer are replaced by straps 31 for supporting the ground electrodes 7, 7', which are provided for this purpose with angle members 32.

According to the modification shown in FIG. 6, the spacer system is composed of a parallelogram 33, which may be deformed by rotating about an axis 34 securely fixed to the support plate 16, so that, by displacement, the major sides 35, 35', approach the edges of the plate. These major sides carry angular wedges 36, 36', cooperating with members of similar shape, fixed to the other support plates 15. By a relative displacement of these wedges, resulting from the rotation of the axis 34, the total thickness of the wedges, that is to say, the spacing of the plates, may be modified or kept at any predetermined value. This rotation may be controlled, for example, by means of a key which is slid between the plates, the handle being manipulated from the outside.

In all the embodiments, the individual elements, whatever their number, are fed by a single air conduit and they evacuate their ozone through a single conduit, whilst being able however to be connected or disconnected as desired.

Such an apparatus has in addition, many advantages which have been mentioned above, particularly that of being able to supply as desired, by adding the appropriate number of elements, the exact weight of ozone desired, and with the maximum yield for a constantly minimum overall size.

We claim:

1. In ozone-producing apparatus, an element that comprises:
   (a) a parallelopipedic casing having major opposed faces which are open;
   (b) a water-cooled, hollow ground electrode supported by fins on the internal edges of said opposed faces;
   (c) a high voltage electrode, constituted by a pair of thin metal plates;
   (d) a thin dielectric member applied against said high voltage electrode;
   (e) a discharge chamber in said casing;
   (f) means actuable from the outside to apply said dielectric member against said ground electrode for cooling and closing said discharge chamber in a sealed manner;
   (g) said casing being apertured at its opposite ends for the inlet of air and the evacuation of ozonised air, the air passing through said discharge chamber from one end to the other.

2. An element according to claim 1, wherein said applying means consist of cam-shaped members.

3. Ozone-producing apparatus comprising a stack of elements, according to claim 1, the respective casings of each said element being supported on one another and an electrode serving simultaneously for two co-adjacent ones of said elements, the connections for air, ozone, electric current and cooling water being made in parallel on a single conduit for all the individual elements.

References Cited
UNITED STATES PATENTS

| | | | |
|---|---|---|---|
| 614,500 | 11/1898 | Ramage | 204—313 |
| 2,561,014 | 7/1951 | Daily | 204—313 |

JOHN H. MACK, Primary Examiner

F. C. EDMUNDSON, Assistant Examiner

U.S. Cl. X.R.

204—313